Jan. 5, 1965   J. MAXWELL ETAL   3,164,563
PROCESS FOR THE PRODUCTION OF MOULDING COMPOSITIONS
Filed June 20, 1962
FIG. I.
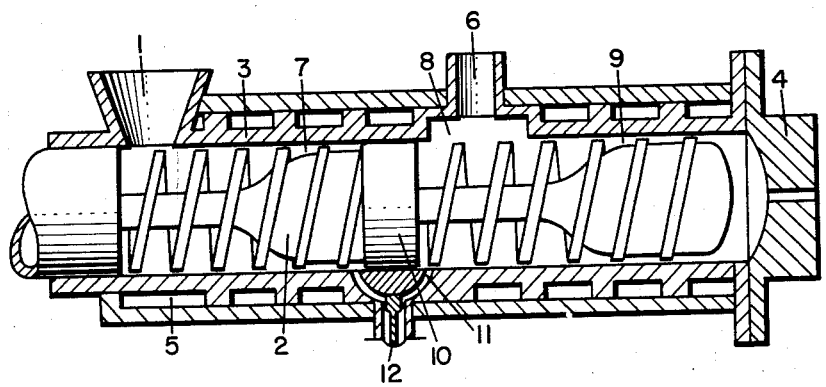
FIG. 2.
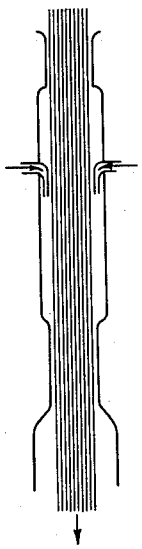
INVENTORS
JAMES MAXWELL
ALAN RUTHERFORD
By Cushman, Darby & Cushman
ATTORNEYS

United States Patent Office 3,164,563
Patented Jan. 5, 1965

3,164,563
PROCESS FOR THE PRODUCTION OF MOULDING COMPOSITIONS
James Maxwell and Alan Rutherford, Welwyn Garden City, England, assignors to Imperial Chemical Industries Limited, London, England, a corporation of Great Britain
Filed June 20, 1962, Ser. No. 203,987
Claims priority, application Great Britain, June 20, 1961, 22,241/61; Feb. 26, 1962, 7,369/62
10 Claims. (Cl. 260—37)

This invention relates to an improved process for the production of moulding compositions containing glass fibers.

Polyamides in granular or powder form have been used for many years in the production of injection moulded articles. Recently a reinforced polyamide moulding compound containing glass fibers has become available in which each granule contains a number of parallel bundles of glass fibers. This compound suffers from the serious disadvantage that the glass fibers tend to remain in these bundles and do not readily disperse during the injection moulding operation. This can result in mouldings with inconsistent properties.

We have found that by preparing a more intimate mixture of glass fibers with polyamides in the manner hereinafter described the resulting moulding composition does not give rise to the aforementioned disadvantage and that our improved process is readily applicable to the production of glass filled moulding compositions based on other synthetic organic thermoplastic polymers.

It is accordingly an object of the present invention to provide an improved process for the production of glass-filled moulding compositions based on synthetic organic thermoplastic polymers.

According to the present invention we provide a process which comprises mixing glass fibers with a synthetic organic thermoplastic polymer in particulate form, the weight ratio of said glass fibers to said polymer lying between 5:100 and 100:100, melt extruding the resulting mixture, causing or allowing any volatile materials to escape from the melt during the extrusion and comminuting the extrudate. Our invention also comprises the moulding compositions made by this process and moulded articles produced from said moulding compositions.

Our invention is applicable to the production of moulding compositions based on synthetic organic thermoplastic polymers generally but is especially useful when the polymer is a polyamide. As is well-known, polyamides are normally obtained by subjecting to polyamide-forming conditions, aminocarboxylic acids or amide-forming derivatives thereof such as lactams, or mixtures of one or more diamines with one or more dicarboxylic acids or the preformed salts of the acids with diamines, or alternatively mixtures of each of the aforementioned classes of polyamide-forming substances. Specific examples of such polyamides are polymerized caprolactam (nylon 6) and polyhexamethylene adipamide (nylon 66) and nylon 6/66 copolymers. Besides being applicable to polyamides our invention can also be used to prepare glass-filled moulding compositions based on, for example, the high molecular weight polymers and copolymers of formaldehyde, the isotactic polymers of propylene, butene-1 and higher mono-α-olefines, polythene and poly(methyl methacrylate).

The diameters of the glass fibers used preferably range from about 0.0002 to 0.0004 inch, but our invention is not restricted to the use of glass fibers having such diameters. The glass fibers may be employed in any of the forms known commercially, for example, glass strands, rovings, tows or yarns. We prefer to use the strands, roving, tow or yarns in continuous lengths; they may however be chopped or otherwise reduced in length before feeding to the extruder.

It is preferred to employ the glass fibers in an amount such that the weight ratio of glass fibers to polymer is from 20:100 to 80:100 for ease of processing combined with the production of moulded articles with improved mechanical properties.

The injection moulded articles made from our glass-filled moulding compositions have consistently good mechanical properties. In particular they have a higher rigidity than unfilled mouldings made from the same polymer, which is of especial importance for large mouldings, e.g., sheets with surface areas greater than about 12 in. square.

Our moulding compositions based on polyamides are also particularly useful insofar as the mouldings produced therefrom have a low coefficient of thermal expansion approaching that of metals such as aluminium, and this is of great advantage when they are to be used in conjunction with non-ferrous metals generally.

The mixture of polymer and glass fibers will normally be melt extruded through the die of a vented screw extruder. The ingredients can be mixed in any convenient manner. For example, they may be blended together in a tumbling device such as a rotating drum, or in a Gardner mixer. Other additives may be incorporated at this stage, for instance pigments and/or lubricants. For ease of feeding the polymer/glass fiber blend into the extruder a small proportion, for instance from about 0.1 to 1.0, e.g., 0.6 weight percent based on polymer of a solid lubricant, such as stearic acid or an alkali or alkaline earth metal stearate may if desired be added. The resulting blend is then introduced into the feed pocket of the vented extruder and further processed in accordance with our invention. Alternatively, the polymer and glass fibers may be introduced in separate streams into the feed pocket of the extruder and mixing of the glass fibers and polymer may first occur in the feed pocket, although it is preferred that such mixing does not occur until the materials are being taken up by the screw of the extruder. When working according to either of the aforesaid alternatives, it is preferred to rotate the extruder screw at a sufficiently high speed to prevent a head of material building up in the feed pocket (hereinafter referred to as "starve feeding"), as otherwise there may be a tendency for the material to "arch" across the feed pocket. When "starve feeding" is employed no lubricant is necessary.

When working according to the above-described method wherein the polymer and glass fibers are fed to the feed pocket in separate streams, the polymer may, if desired, have been tumbled previously with one of the aforementioned solid lubricants. If desired, the glass fibers may be produced in the required lengths by cutting glass rovings above the feed pocket and allowing the cut fibers to fall under gravity into the feed pocket. Instead of cutting the glass rovings immediately above the feed pocket and allowing the cut fibers to fall therein, however, the cut rovings may be produced at a location spaced apart horizontally from the feed pocket and conveyed to and over, the edge of the feed pocket by means of a vibrating tray or equivalent means.

Glass rovings are available commercially and consist of continuous filament strands wound parallel with no appreciable twist. We have found, however, a substantial loss in efficiency may occur when commercially-available rovings are chopped up in apparatus commonly used for cutting multi-strand glass fibers, which apparatus comprises a pair of contra-rotating rolls with their axes of rotation parallel to the surface of one roll having a plurality of metal teeth running parallel to its rotational axis and preferably equally spaced thereon, and the surface of the other roll being formed of rubber or rubber-like material, whereby glass strands fed into the nip formed by the surfaces of the two rolls are comminuted. The loss in efficiency results from the individual glass strands in the cut roving accumulating in the indentations between the cutting edges of the metal teeth. In order to reduce the tendency of the cutter to become choked in this way we have found it desirable to lightly bond together the component strands of the uncut roving. This may be conveniently and cheaply carried out by the application of a liquid which wets the glass fibers, e.g., by passage through an atmosphere of wet steam or through a wet sponge, followed if necessary by partial drying of the treated roving to reduce its water content to an appropriately small amount for instance to about 1 or 2 percent by weight, or even lower. Alternatively, the roving may be treated for the same purpose by passage through a water bath followed by partial drying. The amount of water picked up when using either a water bath or a wet sponge may be reduced by employing an aqueous solution of a material such as caprolactam which volatilizes under the conditions of extrusion. Preferably, however, the rovings (or yarn, tow or filament) are fed directly to the feed pocket, e.g., by nip rolls. The nip rolls, which are preferably of a hard material, for instance a metal, are very conveniently geared to the polymer feed (for instance a screw conveyor) in order to maintain a constant ratio of glass to polymer. To prevent the rovings from becoming entangled while being fed to the feed pocket, suction may be applied to the rovings by for instance a compressed air Venturi system encircling them. When feeding rovings directly to the feed pocket it is not necessary to wet the fibers.

We prefer to extrude the mixture by passing it through the barrel of a screw extruder, applying heat to the barrel sufficient to melt the polymer in the mixture and applying a reduced pressure to the melt through an opening provided for that purpose in the wall of the barrel. A suitable apparatus for carrying out this step in our process comprises a screw extruder having an opening in its barrel wall, which opening is adapted for connecting to vacuum-applying means, the screw threads being interrupted by a cylindrical block which seals the barrel before the decompression zone and a valved duct passing through a barrel wall whereby material from the feed end of the extruder can be introduced at a controlled rate into the decompression zone, by-passing the said seal. If desired, a vented barrel may be used which is left open to the atmosphere without the necessity for applying vacuum, and the vapour pressure developed in the extruder relied on to remove volatiles. Alternatively, vacuum may be applied through an opening in the screw using apparatus such as that described and claimed in our British specification No. 836,133.

The die at the end of the extruder barrel may be provided with one or more orifices. Preferably, the or each orifice will have a similar cross-sectional shape to that of the desired moulding pellets, in which case a transverse cut is all that is necessay to produce regularly shaped particles. In this manner cubes or cylinders of a suitable size for moulding may be obtained directly by extruding the mixture in strip or lace form.

Any of the commercially available polyamide moulding granules may be used in the process of our invention. These are normally sold with relatively low moisture contents, for instance of the order of less than 0.25% by weight of the polymer, such moisture contents being achieved by subjecting the polymer as initially produced in the polymerization apparatus, and subsequently cooled in contact with water, to disintegration followed by a special drying operation which may involve heating to about 100° C. for up to about 16 hours under vacuum. Our invention is particularly useful, however, in that it allows use to be made of polyamides which have not been subjected to intensive drying and which have moisture contents greater than 0.3% by weight, even up to about 3.0% by weight, although the final product will normally contain not more than 0.25% and frequently only 0.1% or less of moisture by weight.

By the use of our invention glass-filled polymer compositions can be made with a relatively high bulk density, for instance moulding powders based on polyhexamethylene adipamide with a bulk density of up to about 0.65 g./cc. may readily be produced.

By preparing an intimate mixture of the glass fibers with polyhexamethylene adipamide in accordance with our invention, and using an amount of glass fibers such that the weight ratio of glass fiber to polymer is from 20:100 to 80:100 moulding compositions may be obtained with particularly high tensile strength and flexural modulus properties. Accordingly we provide moulding pellets formed from compositions comprising an intimate mixture of polyhexamethylene adipamide and glass fibers, the weight ratio of said glass fibers to said polymer in said composition lying between 20:100 and 80:100, said composition having a tensile strength (measured by the method of ASTM D638–58T) of at least 20,000 p.s.i. and a flexural modulus (measured by the method of ASTM D790–58T) of at least $1.0 \times 10^6$ p.s.i.

During the extrusion stage in the preparation of the moulding composition of the present invention the masticating action of the screw will normally tend to convert the glass fibers into short lengths (which will depend upon the design of the extruder) most of them usually being less than 0.070″ long, even when they are fed to the machine in continuous lengths, with most of the fibers being appreciably shorter than this, their length being of the order of 0.020″. This is apparent on examining the glass fibers in the comminuted extrudate. Surprisingly, the resultant moulding compositions in which the major proportion of glass fibers are of these very short lengths, show remarkably high tensile strength, and flexural modulus properties. We therefore provide novel moulding pellets formed from compositions comprising an intimate mixture of polyhexamethylene adipamide and glass fibers, the major proportion of said glass fibers in said pellets being less than 0.07″ long, said composition having a tensile strength (measured by the method of ASTM D638–58T) of at least 20,000 p.s.i. and a flexural modulus (measured by the method of ASTM D790–58T) of at least $1.0 \times 10^6$ p.s.i., and also pelleted moulding compositions comprising pellets formed therefrom.

When the polymer used is poly(methyl methacrylate) from which transparent moulded articles can be produced, it is advantageous to employ glass fibers having a refractive index substantially identical with that of the polymer in order that the fibers are indistinguishable, or not readily distinguishable, in the mouldings made in accordance with the present invention.

It will be appreciated that on fabricating the compositions according to this invention by, for instance, extrusion or injection moulding, further reduction in glass fiber length will usually occur, and, particularly in the reworking of scrap an undesirably high proportion of non-fibrous particles may be produced. As an example, a polyhexamethylene and adipamide composition containing 30% by weight of glass fibers, most of which were about 0.020″ long, was passed four times through a screw extruder and examined microscopically as described in Example 3 below. About half the particles in the field of vision appeared to be non-fibrous fragments, and the physical properties had fallen off sharply. After seven passes through the machine, still more serious breakage of the glass fibers had occurred. Care should therefore be taken to ensure that the compositions are not subjected to more severe or longer mastication than is necessary, in order to reduce as far as possible the loss in reinforcement occasioned by the breaking of the fibers.

Our invention is illustrated but in no way limited by the following examples in which all parts given are by weight.

Example 1

A pre-mix of 30 parts of ¼ in. chopped glass strands of "Fiberglas" H.P.E. filament and 70 parts of a commercial grade of polyhexamethylene adipamide moulding powder in cube-cut form was prepared by allowing streams of the two materials to meet above a tumbler mixer, and tumbling the contents of the mixer for 15 minutes. The pre-mix was then fed to the feed pocket of a vented-barrel screw extruder terminating in a die with a circular orifice ¼ in. in diameter. The barrel and die of the extruder were heated to 280° C., and the opening in the barrel was connected to a vacuum pump. The degree of vacuum applied was 25–30 in. Hg. The extrudate was removed by means of nip rolls through a bath of cold water, excess surface water was blown off the cooled extrudate after leaving the quench bath and finally the extrudate was chopped up in a conventional lace-cutter into pellets of ⅜" in length. The pellets were dried at 100° C. for 16 hours under vacuum and injection moulded into test-pieces having the following properties:

Tensile strength (ASTM S–638–58T) ___ 24,000 p.s.i.
Flexural modulus (ASTM D–790–58T)__ $11 \times 10^5$ p.s.i.
Heat distortion temperature ____ 245° C. (under 264 p.s.i. loading).
Coefficient of linear expansion__ $3.0 \times 10^{-5}$ cm./cm./° C.

Example 2

The above procedure was repeated using 20 parts of the glass fiber filler pre-mixed with 80 parts of "Delrin" (registered trademark) (a high molecular weight polyoxymethylene) and employing extruder barrel and die temperatures of 220° C. Mouldings with excellent mechanical properties were consistently obtained by injection moulding the pellets produced by this procedure.

Example 3

An extrusion apparatus of the type described below and illustrated in cross-sectional elevation in FIGURE 1 of the accompanying drawings was used in accordance with the present invention to prepare glass-filled moulding compositions based on polyhexamethylene adipamide.

With reference to the drawing, 1 is the feed pocket and screw 2 is mounted for rotation in barrel 3 terminating in die 4. The wall of the barrel 3 is hollowed out at 5 for the circulation of heating fluid and is interrupted by vapour exit 6 connected to a vacuum pump (not shown). The depth of the screw flights in the low compression section 8, adjacent vapour exit 6, is greater than in either of the high compression sections 7 and 9. The screw flights are interrupted immediately before the low compression section 8 by a solid cylindrical block 10 having a diameter sufficiently close to the internal diameter of barrel 3 that is rotatable therein with a minimum working clearance. The wall of the barrel 3, is provided with a duct 11, which connects high compression section 7 and low compression section 8. A slidable plunger 12 passes through the wall of barrel 3 and is shown with its head substantially blocking duct 11 at one extremity of its stroke, in the "valve-closed" position.

In operating this apparatus, the plunger 12 was first withdrawn to the "valve open" position. Screw 2 was rotated and hot liquid passed through channels 5 in the barrel wall. The material to be extruded was fed into feed pocket 1 in the manner hereinafter described, and vacuum applied at exit 6. The material was carried forward by the first high compression section 7 of the screw via duct 11 to the low compression section 8 and thence via the second high compression section 9 to the orifice of die 4.

"Fiberglas" H.P.E. filament in the form of 60 end rovings was fed to a glass fiber cutter through a porous sponge body on the surface of which an aqueous solution of caprolactam was continuously allowed to drip. The solution was used at 70° C. and contained 450 parts of caprolactam in 100 parts of water. The cutter was run at such a speed that ¼ in. lengths of glass fibers were produced and fell into the feed pocket of the extruder located below the cutter. Simultaneously a stream of commercially available polyhexamethylene adipamide in cube-cut form (approximately 3 mm. x 3 mm. x 2 mm.) was fed into the feed pocket at such a rate that 70 parts of polymer were introduced for every 30 parts of glass fiber. The temperature of the barrel and the die of the extruder were maintained at 290° C. and the screw was rotated sufficiently rapidly so that a head of material was not allowed to build up in the feed pocket.

A vacuum of 29 in. Hg, was applied to the vent. When any tendency for the degree of vacuum to increase was observed, indicating blockage of the vapour exit 6, the plunger 12 was moved inwards to restrict the flow of material along duct 12 and thereby balance the rates of material transfer into and out of the low compression section 8.

An extruded lace was withdrawn from the ¼ in. diameter circular die by means of nip rolls, the lace was passed through a bath of cold water, excess surface moisture was removed with a series of compressed air jets and finally the lace entered a conventional lace-cutter where it was chopped up into pellets ⅜" long. The temperature of the pellets removed from the cutter was 160° C. and they were subsequently cooled to a temperature below 50° C. in order to prevent their discolouration by passing cold air through a bed of pellets. The pellets were then converted by injection moulding into test-pieces having a tensile strength (ASTM D–638–58T) of 25,800 p.s.i. and a flexural modulus (ASTM D–790–58T) of $10.1 \times 10^5$ p.s.i. After dissolving off the nylon in these pellets with formic acid the lengths of the glass fibers were measured under a microscope and most of them were found to be between 0.016" and 0.018" long.

Example 4

The procedure of Example 3 was modified by feeding the glass rovings therein mentioned directly to the feed-pocket through steel nip rolls, the caprolactam treatment and cutting being eliminated. The roving was tensioned, to prevent it being wrapped round the nip rolls, by a compressed air Venturi system encircling the roving (see FIGURE 2 of the accompanying drawings), and was transported to the feed pocket of the extruder by a vibrating conveyor. The polymer (cube-cut as before) was fed to the extruder by a screw conveyor coupled mechanically to the nip rolls so as to preserve a constant ratio of glass to polymer of 33:67 by weight.

The properties of injection moulded test pieces of the product were as follows:

Tensile strength (ASTM S–638–58T)  23,400 p.s.i.
Elongation at break _____ 2.7%.
Flexural modulus (ASTM D–790–58T) $11 \times 10^5$ p.s.i.
Heat distortion temperature _____ 241° C. (under 264 p.s.i. loading).
Impact strength (BSS 771) _____ 0.6 ft. lb./½" of notch.

Example 5

A pre-mix of 20 parts by weight of ¼ in. chopped glass strands of "Fiberglas" H.P.E. filament ("Fiberglas" is a registered trademark) and 80 parts by weight of a commercial grade of polypropylene powder was prepared by tumble blending the ingredients in a tumbler mixer for 15 minutes. The pre-mix was then fed to the hopper of a vented barrel extruder terminating in a die having 20 circular orifices each 2 mm. in diameter. The barrel of the extruder was heated to 200° C. and the die to 230° C.; the vent in the barrel being left open to atmosphere. The extrudate was chopped into pellets ⅛" in length by means of an air die face cutter, the pellets falling into a bath of cold water. The pellets were removed from the water by means of a vibrating de-watering screen and subsequently dried by means of a hot air blowing system. Similar compositions were prepared from 10 parts of fibers and 90 parts of polypropylene. Starve feeding was not necessary with these compositions; we believe this may have been due to the presence of calcium stearate in the polymer and to the use of polymer in powder form. Injection moulded test pieces had the following properties:

| Test | Units | 0% Glass | 10% Glass | 20% Glass |
|---|---|---|---|---|
| Density | gm./cc | 0.90 | 0.95 | 1.01 |
| Melting point | ° C | 165–170 | 165–170 | 165–170 |
| Tensile Strength (23° C.) | lb./sq.in | 5,000 | 5,400 | 5,900 |
| Elongation to break (23° C.) | Percent | 25 | 25 | 25 |
| Flexural modulus (23° C.) | lb./sq.in | 170,000 | 320,000 | 560,000 |
| Impact strength (notched Izod) (ASTM) | ft.lb./in | 1.0 | 0.7 | 0.7 |
| Mould Shrinkage | Percent | 1.7 | 0.8 | 0.5 |
| Water Absorption (24 hr.) (ASTM D570-57T) | Percent | 0.016 | 0.019 | 0.021 |

*Example 6*

The procedure of Example 4 was modified by replacing the polyhexamethylene adipamide of that Example by "Celcon" (registered trademark) (a high molecular weight oxymethylene polymer containing a small proportion of other oxyalkylene units) and using an extrusion temperature of 210° C.

Results were as follows:

| Test | Percent of glass fiber by weight of composition | | |
|---|---|---|---|
| | 0 | 20 | 30 |
| 100 second apparent flexural Modulus (p.s.i.) | 350,000 | 850,000 | 1,150,000 |
| 100 second apparent tensile Modulus (p.s.i.) | 320,000 | 940,000 | 1,150,000 |
| Percent change in flexural modulus between 20° C. and 110° C. | −30 | −8.5 | −7.5 |

*Example 7*

The procedure of Example 1 was modified by replacing the polyhexamethylene adipamide premix of that example by polythene premixes A and B and using an extrusion temperature of 190° C.

The polythene used had a melt flow index of 20 and density 0.918, and the glass fiber was coated with vinyl trichlorosilane as anchoring agent. Sample A contained 10% and sample B 20% of glass fiber by weight of the composition.

The flexural modulus was determined as before. Blend A showed a threefold increase in stiffness. The tensile yield strength was almost unchanged, but the elongation at break was reduced to about one-third of the normal value.

Washing up bowls moulded from the two compositions showed a most acceptable increase in stiffness and were adequately tough.

*Example 8*

The procedure of Example 4 was modified by replacing the polyhexamethylene adipamide of that example by polymethyl methacrylate, and using an extrusion temperature of 220° C.

The heat distortion temperature, stress to break, strain to break, and energy to break were measured for injection moulded test-pieces of two compositions containing respectively 10% and 20% of glass by weight of the composition.

Results were as follows:
(1) Heat distortion temperature:
 (i) 10% glass, H.D.T.=91° C.
 (ii) 20% glass, H.D.T.=98° C.

(2) Stress to break, strain to break and energy to break:

| Percent age glass | Measurements made parallel or perpendicular to flow during injection moulding | Stress, lbs./in.$^2 \times 10^{-3}$ | Strain, percent | Energy, ft.lbs./in.$^3$ |
|---|---|---|---|---|
| 10 | Perpendicular | 17.3 | 2.8 | 20 |
| 10 | Parallel | 19.2 | 3.5 | 28 |
| 20 | Perpendicular | 19.1 | 3.0 | 24 |
| 20 | Parallel | 22.0 | 3.1 | 30 |

We claim:

1. A process for the production of granules suitable for use in thermoplastic moulding processes which comprises the steps of feeding glass fibers most of which are at least ¼ inch long and a particulate synthetic organic thermoplastic polymer, the weight ratio of said glass fibers to said polymer lying between 5:100 and 100:100 to the feed pocket of a vented screw extruder, masticating said polymer in the plastic state with said fibers in the extruder whereby said fibers are broken into lengths most of which are less than 0.07 inch long, removing from the resulting mixture while still in the plastic state any material volatilized during the mastication step, extruding the mixture and comminuting the extrudate, the rate at which said polymer and said fibers are fed to said feed pocket being proportionated to the rate at which the said mixture is extruded whereby the building up of a head of material in the feed pocket is prevented.

2. A process as set forth in claim 1 wherein said glass fibers initially compose a plurality of continuous strands, and wherein said fibers are wetted as to temporarily bond said strands to one another, the majority of said wetted fibers being cut into lengths at least ¼ inch long prior to the mixing of said fibers with said polymer.

3. A process according to claim 1 wherein the mixture of glass fibers particulate polymer prior to mastication additionally includes a solid lubricant said glass fibers, polymer and lubricant being tumbled together and fed to the feed pocket of a vented screw extruder.

4. A process for the production of granules suitable for use in thermoplastic moulding processes which comprises feeding separately to the feed pocket of a vented screw extruder glass fibers and a particulate synthetic organic thermoplastic polymer, the weight ratio of said glass fibers to said polymer lying between 5:100 and 100:100, substantial mixing of said glass fibers and said polymer being prevented until they are taken up by the screw of the extruder, masticating said polymer and said fibers in the extruder whereby said fibers are broken into short lengths, removing from the mixture while it is in the plastic state in the extruder any material volatilized during the mastication step, extruding the mixture and comminuting the resulting extrudate, the rate at which said polymer and said fibers are fed separately to said screw extruder and the speed of rotation of the screw of said screw extruder being correlated to prevent a head of material building up in said feed pocket.

5. A process according to claim 4 wherein the glass fibers comprise long, reltaively continuous lengths of glass fiber.

6. A process according to claim 5 wherein the glass, before entering the feed pocket, passes through a compressed air Venturi system whereby a tension is set up in the glass sufficient to prevent entanglement of the glass while it is being fed to the feed pocket.

7. A process according to claim 1 wherein said polymer is a polyamide.

8. A process according to claim 7 wherein said polyamide has a moisture content greater than 0.3% by weight.

9. Moulding pellets comprising an intimate mixture of polyhexamethylene adipamide and glass fibers most of which are less than 0.07 inches long, the weight ratio of said glass fibers to said polymer in said composition lying between 20:100 and 80:100, said composition having a tensile strength (measured by the method of ASTM D638-58T) of at least 20,000 p.s.i. and a flexural modulus (measured by the method of ASTM D790-58A) of at least $1.0 \times 10^6$ p.s.i.

10. Moulding pellets according to claim 9 in which the major proportion of the glass fibers are less than 0.02" long.

References Cited by the Examiner

UNITED STATES PATENTS

| | | | |
|---|---|---|---|
| 2,042,743 | 6/36 | Taylor | 18—8 |
| 2,067,251 | 1/37 | Taylor | 18—8 |
| 2,719,325 | 10/55 | Franklin | 18—55 XR |
| 3,016,945 | 1/62 | Wexler. | |
| 3,078,511 | 2/63 | Street | 18—55 XR |

FOREIGN PATENTS 618,094   2/49   Great Britain.

OTHER REFERENCES

Polymers and Resins (Golding), published in 1959 by D. Van Nostrand, Princeton, N.J., page 323.

Textbook of Polymer Chemistry (Billmeyer), published in 1957 by Interscience Publishers, Inc., N.Y., page 286.

ALEXANDER H. BRODMERKEL, *Primary Examiner.*

WILLIAM J. STEPHENSON, MORRIS LIEBMAN, *Examiners.*